United States Patent [19]
Cobb

[11] Patent Number: 5,314,018
[45] Date of Patent: May 24, 1994

[54] APPARATUS AND METHOD FOR SEPARATING SOLID PARTICLES FROM LIQUIDS

[76] Inventor: Delwin E. Cobb, 14321 Lost Meadow La., Houston, Tex. 77079

[21] Appl. No.: 921,715

[22] Filed: Jul. 30, 1992

[51] Int. Cl.[5] .......................................... E21B 43/38
[52] U.S. Cl. .................................. 166/265; 166/105.5; 166/105.1
[58] Field of Search ............... 166/105.1, 105.3, 105.5, 166/68; 210/512.1; 55/455, 205

[56] References Cited

U.S. PATENT DOCUMENTS

| | | | |
|---|---|---|---|
| 1,279,758 | 9/1918 | Putnam . | |
| 1,601,921 | 10/1926 | McCoy | 166/105.1 |
| 1,759,004 | 5/1930 | Dunlap | 166/105.1 |
| 2,665,645 | 1/1954 | Wells | 166/105.1 |
| 2,701,533 | 2/1955 | Abney | 166/105.1 |
| 2,783,716 | 3/1957 | Varner | 166/105.1 X |
| 3,128,719 | 4/1964 | Jongbloed et al. | 166/105.5 |
| 3,289,608 | 12/1966 | Laval, Jr. | 55/455 X |
| 4,070,168 | 1/1978 | Beattle | 55/205 |
| 4,148,735 | 4/1979 | Laval, Jr. | 166/105.1 X |
| 4,244,708 | 1/1981 | Bielefeldt | 55/1 |
| 4,407,360 | 10/1983 | Hambrick | 166/68 |

*Primary Examiner*—Stephen J. Novosad
*Attorney, Agent, or Firm*—Bush, Moseley & Riddle

[57] ABSTRACT

Apparatus and method for separating solid particles from well fluids in the bore hole including a separator or separation device (34) adjacent the lower end of a tubing string (14) positioned within a perforated casing (10). The separator device (34) includes concentric tubular members (44, 46) defining an annulus (60) therebetween. A spiral guide (62) is positioned in the annulus (60) about the inner tubular member (46) below perforations (54) in the outer tubular member (44) and extends about the inner tubular member (46) for around a complete turn or 360 degrees. A helical motion is imparted to the well fluids received through the perforations (54) and solid particles settle downwardly within the vortex or swirl chamber (79) below the inner tubular member (46). The liquid separated from the solid particles is pumped by a downhole pump (18) upwardly through the inner tubular member (46).

17 Claims, 2 Drawing Sheets

FIG. 3
FIG. 6
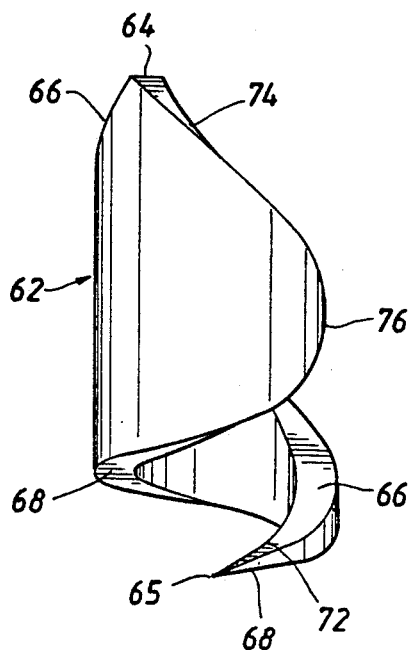
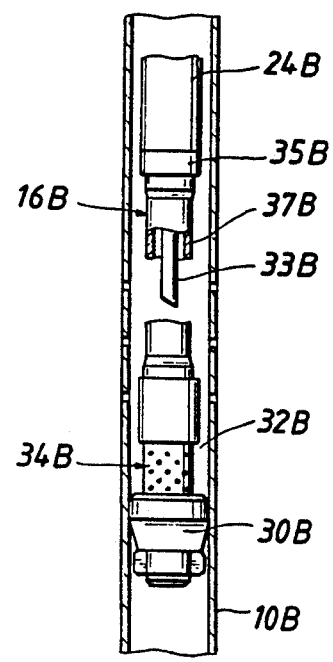
FIG. 4
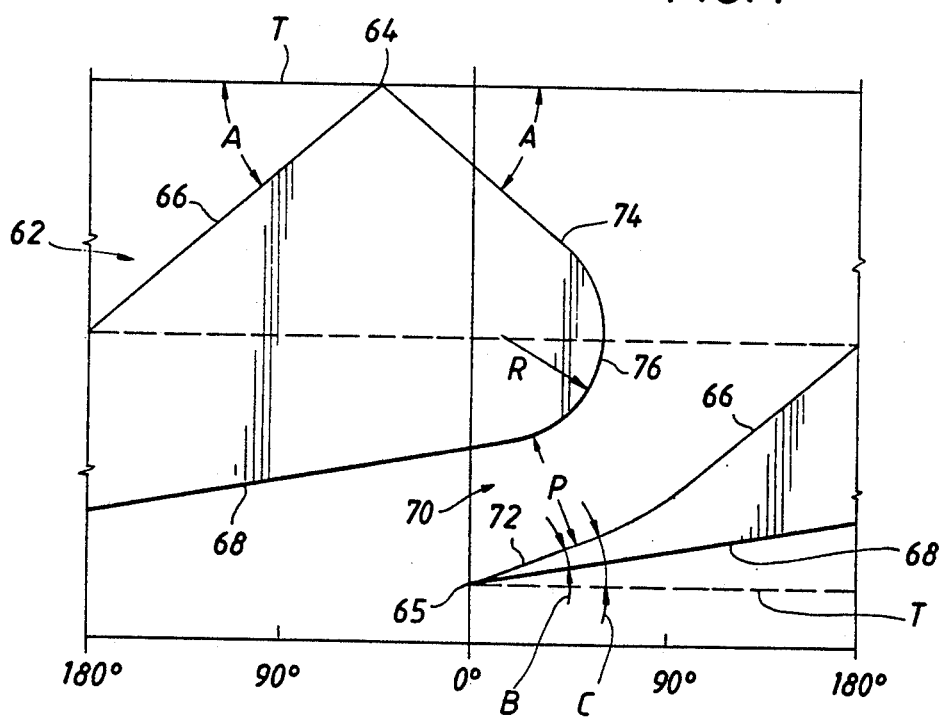

APPARATUS AND METHOD FOR SEPARATING SOLID PARTICLES FROM LIQUIDS

FIELD OF THE INVENTION

This invention relates to an apparatus and method for separating solid particles from liquids, and more particularly to such an apparatus and method in which the separator imparts a helical motion to the fluid containing the solid particles and liquids for separating the solid particles from the liquids.

BACKGROUND OF THE INVENTION

Downhole pumps are widely used in oil and water wells. It is highly desirable to remove sand and other solid particles from the well fluids before they enter the downhole pump to reduce wear and plugging of the pump and other components. Repairing or replacing downhole pumps is expensive as a result of rig time, labor costs, part costs, lost production and the like.

When large quantities of sand flow into the well bore, it is desirable to stop or reduce the sand flow. Various sand control systems have been utilized heretofore to stop or reduce the sand flow into the well bore. However, even with sand control systems, in many instances sand or other solid particles are entrained with the liquid pumped through the downhole pump. Screens or filter openings have been utilized heretofore in the casing or other members to restrict the flow of solid particles. However, if the filter openings are too small, the openings will eventually become plugged, and if the filter openings are too large, solid particles will flow through the openings. In may wells, the quantity of sand flowing from the formation is relatively small but sufficient to wear or plug the downhole pump. The sand flow is often relatively large each time the pump is started, but is reduced or ceases after a time period of continuous flow. For example, gravel packs are widely used to keep sand from flowing into the well bore. While gravel packs may be utilized in a satisfactory manner to restrict the flow of sand in some formations, they are not effective in other types of formations. In such formations, the wells have to be pumped at a low rate to reduce the amount of flowing sand and if production rate is not sufficient to justify the high maintenance cost then such a well is usually abandoned.

U.S. Pat. No. 4,900,453 dated Feb. 13, 1990 shows an oil separator in which a spiral guide is provided for downward fluid flow to separate solid particles from liquids. However, the spiral guide does not show a downward helical path for the fluid which decreases in cross sectional area between upper and lower ends of the spiral path to provide a relatively smooth flow at a progressively increasing velocity.

SUMMARY OF THE INVENTION

The present invention is particularly directed to an apparatus and method for separating solid particles, particularly sand, from liquids in a well bore below a downhole pump so that the solid particles are not pumped through the pump with the well fluids. The separator is adapted for use particularly in wells that flow large amounts of sand for short time periods during start up, and in wells that flow small amounts of sand continuously. The separator or separation device preferably is used with wells that produce relatively small amounts of solid particles as the collection or storage volume in the well is usually limited. However, even at high sand flow rates with the sand collection volume filled, the separator does not plug.

The separator or separation device is positioned in the lower end of a downhole tubing string below a downhole pump. The separation device includes an inner tubular member mounted concentrically within an outer tubular member to define an annular space or annulus which is blocked or closed at its upper end. Perforations are provided in the outer tubular member adjacent the upper end of the inner tubular member and are of a diameter less than the radial width of the annular space between the tubular members for screening solid particles entering the annular space or clearance so that plugging or clogging of the annular space does not occur. A spiral guide is positioned about the inner tubular member in the annular space between the inner and outer tubular members below the perforations in the outer tubular member to direct and impact a centrifugal motion to the solid particles entering the annular space from the perforations in the outer tubular member. The upper surface of the spiral guide defines a spiral path which extends downwardly for around one complete turn or 360 degrees about the inner tubular member. Thus, the solid particles are guided laterally by the inner surface of the outer tubular member in a helical movement and guided downwardly by the upper surface of the spiral guide. The lower surface of the spiral guide also forms a helical surface and a discharge orifice is formed between the upper and lower helical surfaces at the lower end of the spiral guide to provide a continuous and smooth helical flow into the swirl or vortex chamber below the inner tubular member where the solid particles settle and collect. The liquid separated from the solid particles in the vortex chamber below the inner tubular member is pumped upwardly through the inner tubular member and the downhole pump to a surface location. A lower end portion of the inner tubular member extends below the spiral guide for maintaining the helical movement of the fluid and entrained solid particles until the swirl chamber below the inner tubular member is reached.

The spiral guide defines an orifice for the fluid which decreases in size from the upper entrance to the guide to the lower exit from the guide. The progressively decreasing size of the orifice effects a smooth fluid flow with minimal turbulence at an increased velocity. While the width or radial thickness of the orifice for the helical guide remains the same, the length or height of the orifice as measured at right angles to the helical flow path decreases from the upper end portion of the guide to the lower end portion of the guide.

A separate embodiment of the separator includes an inner tubular member which has a separate gas passage therein in fluid communication with the annulus to permit gas to flow from the annulus through the inner tubular member, and then into a gas outlet in fluid communication with the gas passage in the inner annular member.

It is an object of this invention to provide an apparatus and method for separating solid particles from liquids including a separator which imparts a helical motion to fluid in an annulus for separating the solid particles therein and increases the velocity of the fluid.

It is another object of this invention to provide such an apparatus and method for separating solid particles from well fluids in a well bore below a downhole pump to minimize the pumping of solid particles through the pump thereby to increase the life of the downhole pump.

It is a further object of this invention to provide such an apparatus and method in which a separator or separating device is provided in the tubing string below a downhole pump and includes guide means positioned in an annulus between concentric inner and outer tubular members for guiding the well fluids including entrained solid particles downwardly in a spiral path of a decreasing size to impart a helical motion to the solid particles so the solid particles settle downwardly and the separated liquid is pumped upwardly through the inner tubular member.

Other objects, features, and advantages of this invention will become more apparent after referring to the following specification and drawings.

BRIEF DESCRIPTION OF THE DRAWINGS

FIG. 3 is a side elevation of the spiral guide of the separation device shown in FIG. 2 removed from the separation device and adapted for mounting in the annulus between inner and outer tubular members of the separation device;

FIG. 4 is a schematic view of the spiral guide shown in FIG. 3 shown in a flat relation for a complete turn about the inner tubular member;

FIG. 6 is an elevational view, partly schematic, showing a further modification of the separation device of the present invention utilized with a rod-type downhole pump and having a packer positioned below the separation device.

DESCRIPTION OF THE INVENTION

Figure 1:
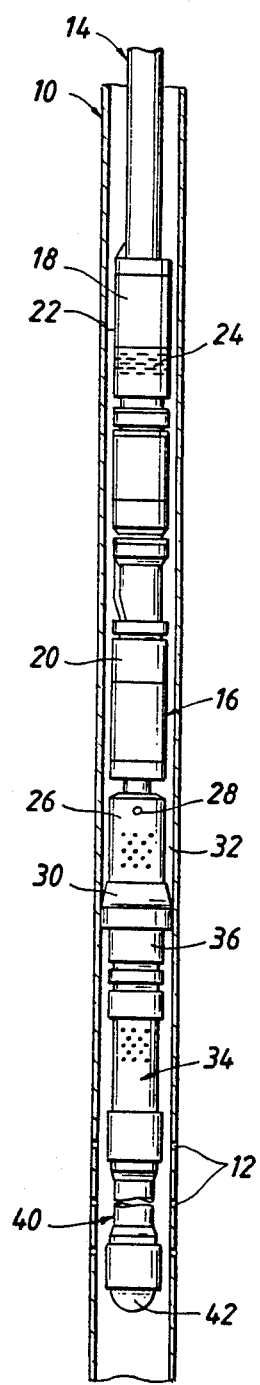
FIG. 1 is a sectional view of a tool string connected to the lower end of a tubing string mounted within a casing in a well bore and including the separation device of the present invention for the separation of sand and other solid materials from well fluids below a downhole pump.

Referring now to the drawings for a better understanding of this invention, and more particularly in FIG. 1, an outer casing is shown generally at 10 positioned within a well bore and having perforations 12 adjacent its lower end for the entry of well fluids from the adjacent formation. Mounted within casing 10 is an upper tubing string generally shown at 14 extending to a surface location and a lower tool string generally indicated at 16 supported from tubing string 14. Tool string 16 includes a submersible downhole pump generally shown at 18 driven from an electric motor 20 supplied with electrical energy from an electrical cable 22 extending to a surface location. The intake for pump 18 is shown at 24 and well fluids are pumped from casing 10 through tubing string 14 to a surface location. A perforated sub shown at 26 is connected by a shear pin 28 to the lower end of electric motor 20.

An annular seal or packer 30 is provided about tool string 16 and seals casing annulus 32 at a location below perforated sub 26. Mounted below packer 30 is the separator or separation device forming an important part of the present invention and shown generally at 34.

A bypass valve shown generally at 36 is provided between separator 34 and packer 30 comprising a pressure-sensitive bypass valve which is utilized primarily with a separator having a relatively low or small flow rate. Bypass valve 36 allows separator 34 to be installed and used at relatively small flow rates when seal 30 is engaged. In the event a bypass valve is not utilized, a relatively large pressure differential may be provided on opposite sides of seal 30 since seal 30 acts as a pump to force displaced fluid through separation device 34 or back into the formation when the device is being installed in the well bore. A mud anchor is shown generally at 40 forming a collection volume for solid particles beneath collection device 34 and a bull plug 42 plugs the end of tool string 16. Mud anchor 40 collects sand and other solid particles and may be of a substantial length such as thirty (30) to three hundred (300) feet, for example. Sand in the well fluids from the adjacent formation enters casing 10 from perforations 12 and pump 18 pumps the well fluids to a surface location.

Referring now particularly to FIGS. 2–5, the separation device or desander of the present invention illustrated generally at 34 comprises an outer tubular member generally indicated at 44 and a concentric inner tubular member generally indicated at 46. Outer tubular member 44 includes an upper coupling 48 and a lower outer tube 50 being externally threaded and secured to coupling 48. The upper end of tube 50 defines an annular shoulder 52 and laterally extending perforations 54 extend through the wall of tube 50. Perforations 54 are of a diameter illustrated at D in FIG. 2. Inner tubular member 46 in concentric relation to outer tubular member 44 has an upper large diameter end portion 56 with an outer flange 58 thereon fitting in supporting relation on annular shoulder 52. The remaining small diameter body portion 58 extends downwardly from enlarged diameter upper end portion 56 and defines an annulus or annular chamber 60 between concentric tubular members 44 and 46. A central bore 61 extends through inner tubular member 46 and acts as an outlet for the flow of fluids from the bottom portion of casing 10 received through perforations 12. Annular chamber or clearance 60 has a radial width or thickness indicated at W which is greater than the diameter D so that perforations 54 act as a screen or filter to prevent large size solid particles from entering clearance chamber 60 thereby minimizing the possibility of clogging annular chamber 60. For example, perforations 54 may have a diameter D of around 5/16 inch with radial width W being around ⅜ inch, for example. Radial width or thickness W will vary generally between around ¼ inch to 1 inch.

A spiral or helical guide generally indicated at 62 is positioned within annulus 60 about the outer surface of small diameter body portion 58 of inner tubular member 46 and has a width generally the same as the radial width of annulus 60. Spiral guide or ramp 62 as shown particularly in FIGS. 3 and 4 has an upper end 64 and a lower end 65 and extends at least for a full turn or 360 degrees about inner tubular member 46 in a generally downwardly clockwise direction as viewed in top plan. Spiral guide 62 has an upper helical surface 66 and a lower helical surface 68. Upper helical surface 66 extends at an angle A relative to the transverse axis T of tool string 16 and is preferably around 45 degrees. An angle A between around 30 degrees and 60 degrees has been found to function in a satisfactory manner. If angle A is less than around 30 degrees, for example, sand or solid particles may collect on upper surface 66 which could disrupt the smooth flow of sand or solid particles along upper surface 66 and cause possible clogging or plugging.

A discharge orifice is formed at 70 between the lower end 65 of guide 62 and the adjacent lower surface 68 through which the solid particles are discharged by the spiral ramp 62. Orifice 70 is of a height indicated at P in FIG. 4 as measured at right angles to the helical flow path and decreases constantly from the upper end 64 to the lower end 65 of guide 62. The cross sectional area as measured at right angles to the helical flow path along spiral guide 62 constantly decreases from the upper end 64 of guide 62 to discharge orifice 70 at the lower end 65 of guide 62. As a result, the velocity of the fluid along the helical path is constantly increasing from the upper end to the lower end of guide 62 to provide a smooth, low turbulent flow. Orifice 70 forms a rectangular orifice opening and is sized to provide a large acceleration force such as between 70 and 300 G's without producing excessive pressure losses or abrasive action. The width of the orifice opening as determined by the radial width of annulus 60 should be less than the height P and at least around five times larger than the maximum sand size in order to minimize plugging. Upper surface 66 tends to flatten out before reaching lower end 65 as indicated by lower end portion 72 of upper surface 66. An angle B preferably around 10 degrees is formed between lower surface 68 and the lower end portion 72 of upper surface 66. An angle B between around 5 degrees and 20 degrees has been found to be satisfactory. An angle C preferably around 20 degrees is formed between lower end portion 72 of upper surface 66 and transverse axis T of tool string 16. Angle C between around 10 degrees and 30 degrees would operate satisfactory in providing a desired centrifugal movement and smooth flow to the well fluids entering perforations 54. An upper surface 74 extends in a direction opposite upper surface 66 and is connected by a radius 76 to lower surface 68 as shown clearly in FIG. 4. Surface 74 extends at an angle A relative to the transverse axis T of tool string 16 and is preferably around 45 degrees.

Figure 2:
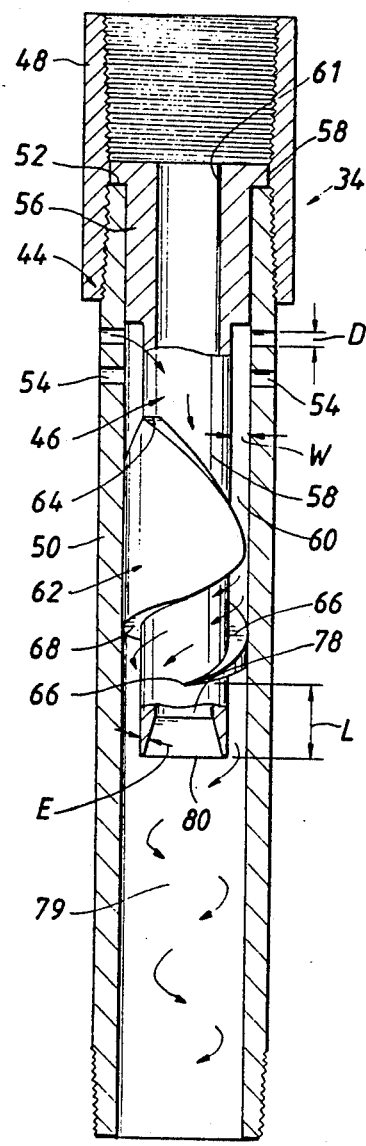
FIG. 2 is a longitudinal sectional view, partly in elevation, of the separation device comprising the present invention removed from the tool string.

A lower end portion of tube 58 below spiral guide 62 is shown generally at 78 and extends for a length indicated at L in FIG. 2. The length L of lower end portion 78 is preferably around twice the height P of the discharge orifice 70. A length L of between around one-half to five times the height P of orifice 70 would provide satisfactory results. Lower end portion 78 provides additional time for the solid particles to move outwardly in a helical motion along the inner surface of outer tubular member 44. As an alternative, the spiral length of spiral guide 62 could be extended but by increasing the length of spiral guide 62, increased pressure losses are provided and possible plugging or clogging may occur. A vortex or swirl chamber is provided within outer tubular member 44 below inner tubular member 46 as shown at 79. The solid particles settle or move downwardly into mud anchor 40 while the separated liquids move upwardly through bore 61 of inner tubular member 46. Fluid flow including entrained solid particles flowing through discharge orifice 70 along a helical path and motion to provide a continuous smooth flow into the swirl or vortex chamber 79. A velocity of between ten (10) to twenty-five (25) feet per second is desired for the fluid at discharge orifice 70 so that a smooth helical path is maintained after the fluid exits orifice 70 and sufficient centrifugal forces are generated to move the solid particles radially outwardly without producing excessive wear or pressure losses.

The lower end of lower end portion 78 is shown at 80 and provides an inlet opening to bore 61 for the pumping of well fluids. The wall of lower end portion 78 is tapered as shown at E in FIG. 2 to guide the upward flow of liquids into bore 61 of inner tubular member 46 for pumping fluids from casing 10. Angle E is preferably around 10 degrees but satisfactory results may be obtained with a taper between around 5 degrees and 20 degrees, for example, on the inner surface of end portion 78. Such a taper reduces turbulence at the entrance to lower end portion 78 and reduces the fluid velocity thereat. It is desirable to maintain a low pressure drop in order to reduce the pumping force for maintaining a relatively high fluid level in casing 10. A relatively high fluid level provides additional space for the relatively long mud anchor 40 which provides a collection chamber for the solid particles. A large flow coefficient is desirable and is obtained with a relatively small pressure loss and a continuous smooth flow by the present invention.

Figure 5:
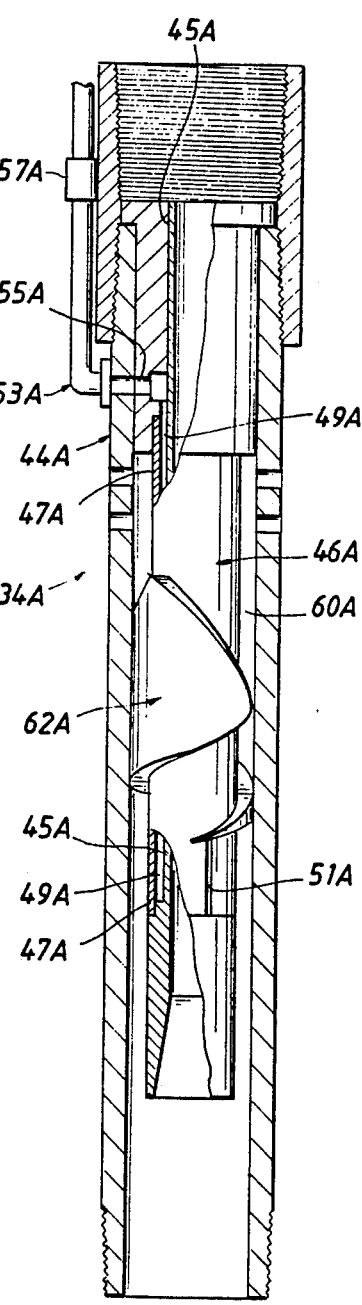
FIG. 5 is a sectional view of a modified separation device in which means are provided for the separation of gas through a separate gas passage in the inner tubular member.

Referring now to FIG. 5, another embodiment of the separation device is shown at 34A which includes an outer tubular member generally indicated at 44A and a concentric inner tubular member generally indicated at 46A with an annular clearance 60A therebetween. A spiral guide is shown at 62A which is similar to the spiral guide shown in FIG. 2. Inner tubular member 46A has an inner wall 45A and an outer wall 47A to define an annular chamber or annulus 49A therebetween for gas. Gas inlet slots shown at 51A extend through outer wall 47A and are in fluid communication with annular chamber 49A. A gas outlet tube generally indicated at 53A has an end portion 55A in fluid communication with annulus 49A to receive gas from gas inlet slots 51A. A check valve 57A in gas outlet tube 53A prevents a reverse flow of gas through outlet tube 53A and keeps annulus 49A filled with gas. Gas outlet tube 53A extends upwardly in the casing annulus thereby to provide gas separation as may be desirable. The gas separator could also be utilized at other locations, if desired.

Referring to FIG. 6, the separation device of this invention is shown at 34B utilized in a further embodiment of this invention with a reciprocating rod-type downhole pump having a lower pump barrel shown at 24B. A seal or packer 30B seals the casing annulus 32B adjacent casing 10B at a location below perforations 12B and below separating device 34B. The tubing string 16B is open at its lower end so that solid particles may be collected in the lower end of casing 10B. Thus, a relatively large volume is provided for the collection or settling of the solid particles by the modification shown in FIG. 6.

For an intermittent-flow rod pump, a continuous flow through separator 34B is provided by a gas trap tube shown at 33B at the bottom end of a pump standing check valve shown at 35B for trapping gas in an intermediate section 37B of tubing string 16B between the pump and separation device 34B. The efficiency of separator device 34B is reduced by intermittent flow provided by the reciprocating rod pump but the efficiency is improved when fluid flow through separator device 34B continues during the downward stroke of the reciprocating pump. The trapped gas in the tubing string 16B acts as an accumulator by expanding on the upward stroke of the pump and compressing on the downward stroke of the pump. Thus, when the pump flow stops on the downward stroke, fluid flow continues through separator device 34B to compress the trapped gas that expanded during the pumping stroke. A continuous flow may also be provided by utilizing a packer and a perforated sub between the rod pump and the separation device as in the arrangement shown in FIG. 1 with the casing annulus acting as an accumulator.

It is apparent that the separator comprising the present invention may be utilized in combination with various other components. For example, a shroud could be used instead of a packer or seal if the casing annulus is of a sufficient radial width. The packer, if used, may be positioned at various locations and could be a separate unit or part of the separator, if desired. Also, the separator of this invention may be utilized with wells deviated as much as 50 degrees and function satisfactorily. Further, a sleeve insert could, if desired, be positioned within the outer tubular member to optimize the shape of the orifice and the size of the inner tubular member for different flow rates through the inner tubular member. It may be desirable, under certain conditions, to have the spiral guide formed of a resilient material instead of a rigid material to permit the orifice to change its shape in the event of plugging thereby to release the plugged solid particles restricting or blocking flow.

While preferred embodiments of the present invention have been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A downhole tubing string adapted to be positioned within a well bore for removing liquids from the well and comprising:
   a tubular body extending within the well bore; and
   a separation device connected to said tubular body adjacent the lower end thereof for separating solid particles from liquids so that the separated solid particles are not forced to a surface location;
   said separation device including;
   an outer tubular member and a concentric inner tubular member defining an annulus between said inner and outer members;
   fluid inlet means for said outer tubular member in fluid communication with said annulus;
   means blocking fluid flow upwardly from said annulus; and
   a spiral guide in said annulus between said tubular members and below said fluid inlet means for directing solid particles received from said fluid inlet means downwardly in a helical motion for settling of said solid particles below said inner tubular member with the separated liquid flowing upwardly from the lower end of said inner tubular member through said inner tubular member to a surface location, the cross sectional area of the helical path along the spiral guide as measured at right angles to the helical flow path decreasing between the upper end and the lower end of said guide thereby to provide a relatively smooth flow at a progressively increasing velocity.

2. A downhole tubing string as set forth in claim 1 wherein said spiral guide extends about said inner tubular member for at least around 360 degrees.

3. A downhole tubing string as set forth in claim 1 wherein said spiral guide has an upper helical surface for directing the liquid and entrained solid particles with the upper surface adjacent the upper end of said guide being at an angle greater than around 30 degrees with respect to the transverse axis of the tool, and the upper surface adjacent the lower end of said guide being at an angle less than around 25 degrees with respect to the transverse axis of the tool thereby to provide a relatively smooth helical motion.

4. A downhole tubing string as set forth in claim 3 wherein the inner surface of the lower end portion of said inner tubular member defines an inner surface tapered at an angle of between around 5 degrees and 20 degrees with respect to the longitudinal axis of the tool thereby to provide a relatively smooth flow entrance to the inner tubular member for the separated liquid.

5. A downhole tubing string as set forth in claim 1 wherein said inner tubular member has a lower end portion below the lower end of said spiral guide of a length at least equal to around the outer diameter of said inner tubular member for continuing the downward swirling action of the liquid and entrained solid particles.

6. A downhole tubing string as set forth in claim 1 wherein said outer tubular member has an upper annular shoulder thereon, and said inner tubular member has an upper annular flange supported on said shoulder.

7. A downhole tubing string as set forth in claim 1 wherein said inner tubular member has a central bore therethrough defining a passage for the upward flow of liquids and a separate gas passage therein for the upward flow of gas, said gas passage being in fluid communication adjacent its lower end with said annulus for the entry of gas from the annulus.

8. A downhole tubing string as set forth in claim 7 wherein a gas outlet in fluid communication with said gas passage in said inner tubular member extends through said outer tubular member and upwardly therefrom in the annulus between said casing and said tubing string.

9. A downhole tubing string as set forth in claim 1 wherein a perforated casing is provided in said well bore;
   a pump is positioned in said tubing string above said separation device; and
   a packer is positioned in the annulus between the casing and the tubing string above said separation device.

10. A downhole tubing string as set forth in claim 1 wherein a perforated casing is provided in said well bore;
    a pump is positioned in said tubing string; and
    a packer is positioned in the annulus between the casing and the tubing string below said separation device.

11. In a downhole tool string positioned within a well bore and having a tubular body for removing fluids from the well; a separation device connected to said tubular body adjacent the lower end thereof for separating solid particles from liquids so that the separated solid particles are not removed from the well; said separation device comprising:
    an outer tubular member and a concentric inner tubular member defining an annulus between said inner and outer members;
    a fluid inlet passage in said outer tubular member extending to said annulus;

means blocking fluid flow upwardly from said annulus; and guide means in said annulus between said tubular members and below said fluid inlet passage for directing solid particles received from said fluid inlet passage downwardly in a helical motion for settling of said solid particles below said inner tubular member with the separated liquid flowing upwardly from the lower end of said inner tubular member through said inner tubular member to a surface location, the cross sectional area of the helical path along the spiral means as measured at right angles to the helical flow path decreasing between the upper end and the lower end of said guide means.

12. In a downhole tool string as set forth in claim 11; said guide means including a single spiral guide having an upper helical surface for directing the liquid and entrained solid particles downwardly in a helical motion.

13. In a downhole tool string as set forth in claim 12; said inner tubular member having a lower end portion below the lower end of said spiral guide of a length at least equal to around the outer diameter of said inner tubular member for continuing the downward swirling action of the liquid and entrained solid particles.

14. In a tool string having a tubular body for removing fluids from a fluid reservoir; a separation device connected to said tubular body adjacent the lower end thereof for separating solid particles from liquids so that the separated solid particles are not removed from the fluid reservoir; said separation device comprising:

an outer tubular member and a concentric inner tubular member defining an annulus between said inner and outer members;

a fluid inlet passage in said outer tubular member extending to said annulus and restricting large solid particles from entering said annulus through said fluid inlet passage;

means blocking fluid flow upwardly from said annulus; and spiral guide means in said annulus between said tubular members and below said fluid inlet passage for directing solid particles received from said fluid inlet passage downwardly in a helical motion for settling of said solid particles below said inner tubular member with the separated liquid flowing upwardly from the lower end of said inner tubular member through said inner tubular member to a separate location; said spiral guide means extending about said inner tubular member for at least around 360 degrees, the cross sectional area of the helical path along the spiral means as measured at right angles to the helical flow path decreasing between the upper end and lower end of said guide means.

15. In a tool string as set forth in claim 14 wherein said spiral guide means has an upper helical surface for directing the liquid and entrained solid particles with the upper surface adjacent the upper end of said guide means being at an angle greater than around 30 degrees with respect to the transverse axis of the tool string; and the upper surface adjacent the lower end of said guide means being at an angle less than around 25 degrees with respect to the transverse axis of the tool thereby to provide a relatively smooth helical motion.

16. In a downhole tubing string having a tubular body adapted to be positioned within a well bore for removing liquids from the well and comprising:

a separation device connected to said tubular body adjacent the lower end thereof for separating solid particles from liquids in well fluids so that the separated solid particles are not forced to a surface location; said separation device having an outer tubular member and a concentric inner tubular member defining an annulus therebetween, a fluid inlet passage in said outer tubular member extending to said annulus, and spiral guide means in said annulus below said fluid inlet passage for directing well fluids received from said fluid inlet passage downwardly in a helical motion for separation of the solid particles from the liquids;

a reciprocating rod-type pump in the tubular body above the separation device; and gas accumulator means in an intermediate section of the tubular body between the reciprocating pump and the separation device relative to the flow path of said well fluids for the collection of gas therein and being in fluid communication with said separation device, said gas accumulator means permitting expansion of gas in said intermediate section on the upward stroke of the reciprocating pump and compressing gas on the downward stroke of the reciprocating pump, the compressed gas on the upward stroke of said pump permitting well fluids through said separation device thereby to provide a generally continuous flow of well fluids through said separation device during the upward and downward strokes of said reciprocating 17. A method for separating solid particles from liquids in well fluids of a bore hole for the pumping of the separated liquids from the bore hole; said method comprising the following steps:

providing a separation device adjacent the lower end of a downhole pipe string with the separation device having concentric inner and outer tubular members for defining an annulus therebetween;

providing a fluid inlet in said outer tubular member in fluid communication with said annulus to permit the flow of well fluids with entrained solid particles through said fluid inlet into said annulus;

providing guide means in said annulus below said fluid inlet extending about said inner tubular member in a downward spiral path;

directing said well fluids from said fluid inlet along said guide means in a spiral path about said inner tubular member to impart a helical motion to said well fluids for movement to a separation chamber below said inner tubular member;

collecting solid particles separated from said well fluids adjacent the bottom of said separation chamber;

pumping the liquid in said well fluids separated from said solid particles upwardly through said inner tubular member;

providing a separate gas passage for said inner tubular member in fluid communication with said annulus and extending upwardly to a surface location;

removing gas from said well fluids at a position adjacent the lower end of said inner tubular member for flow into said gas passage for removal from said bore hole; and providing check valve means in said separate gas passage to block a reverse flow of gas from said inner tubular member for maintaining an amount of gas below said check valve means.

* * * * *